D. H. HART.
SPRING TAKE-UP FOR TROLLEY WIRES.
APPLICATION FILED JUNE 1, 1916.

1,213,360. Patented Jan. 23, 1917.

Witness

Inventor
D.H. Hart.
By
Attorney

UNITED STATES PATENT OFFICE.

DEMETRIUS H. HART, OF BIRMINGHAM, ALABAMA.

SPRING TAKE-UP FOR TROLLEY-WIRES.

1,213,360.  Specification of Letters Patent.  Patented Jan. 23, 1917.

Application filed June 1, 1916. Serial No. 101,202.

*To all whom it may concern:*

Be it known that I, DEMETRIUS H. HART, a citizen of the United States of America, residing at Birmingham, in the county of Jefferson and State of Alabama, have invented certain new and useful Improvements in Spring Take-Ups for Trolley-Wires, of which the following is a specification.

My invention relates to a device adapted to be utilized in connection with trolley lines and long stretches of wire and cable for the purpose of automatically taking up slack as the trolley or cable expands and giving back the slack taken up as the trolley or wire contracts.

One important feature of my invention is that it is adapted to be applied to the wire without severing the latter, thereby making it possible to insert and remove the devices at will and responsive to the seasonal requirements.

According to my invention, I provide a frame with guides for directing a loop of the cable so that it can be passed around a curved spring preferably in the form of a split spring ring. As the wire contracts its tension draws in the loop and contracts the spring ring and as the wire expands the spring expands with it and takes up the slack into the loop. Where my invention is applied to trolley wires I provide a novel means for bridging the gap left at the neck of the loop, which bridging means is preferably yieldingly held in position so as to conform to changes in shape of the loop due to expansion and contraction of the spring ring. In order to reduce the length of this bridging means to a minimum I associate with the spring a brace means carrying guides under which the wire passes to and from the spring and between which guides is interposed the bridging means. These guides are brought as close together as will direct the wire to the spring so that the latter will exert its compensating functions freely.

My invention further comprises the novel details of construction and arrangements of parts, which in their preferred embodiment are illustrated in the accompanying drawings, which form a part of this specification, and in which:—

Figure 1:
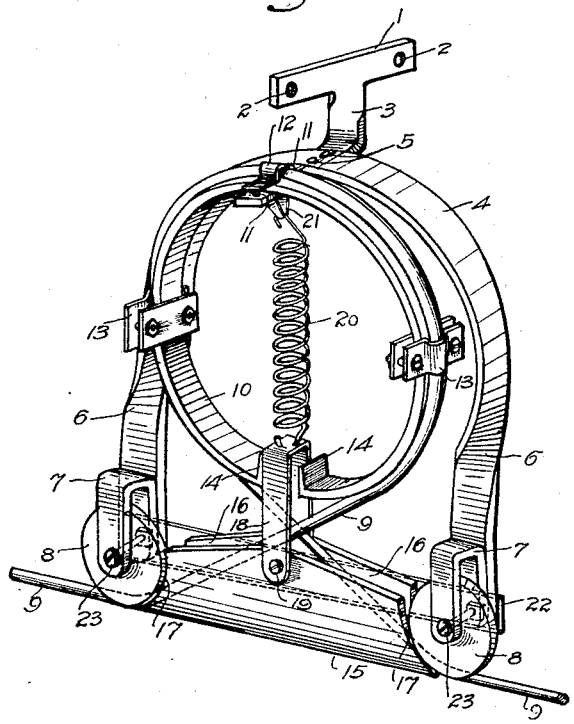
Figure 2:
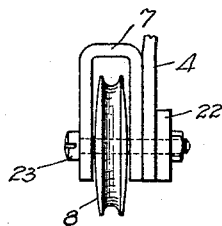

Figure 1 illustrates the apparatus in perspective view applied to the trolley wire; and Fig. 2 is a detail end view.

Similar reference numerals refer to similar parts throughout the drawings.

As illustrated, the device comprises a bracket support which is provided with a top cross bar 1 having holes 2 in its ends to receive wires or cables (not shown) that are suspended from any suitable support. An arm 3 depends centrally from the support and is given a right angled bend and half turn twist to dispose its end horizontally and in line with the cross bar 1. An inverted U-shaped bracket 4 is attached to the arm 3 by bolts 5 and its ends are bent to one side and given a half twist at 6 to receive a bearing yoke 7 for the grooved guide wheel 8 for the trolley wire or cable 9. If desired, the yoke may be formed integrally with or attached to the bracket. The bracket and wheels preferably stand in parallel planes and at right angles to the cross bar 1. The ends of the bracket are offset to one side sufficiently to set the wheels 8 in a vertical plane which will bisect the wire and also the center of the split spring ring 10 which is rigidly secured at its upper end diametrically opposite from the split therein by means of bolts 11 to the outer end of the arm 3. These same bolts serve to clamp a wire fastening clip 12 to the spring, the clip being grooved to receive the trolley wire and clamp it tightly to the outer periphery of the spring. The trolley wire passes from the left hand guide 8 in a direction counter-clockwise about the spring and passes from the spring to the right hand guide wheel. The trolley wire is held to the sides of the spring by clamps 13. The ends of the spring are upturned at 14 and serve as stops which engage each other and prevent the contraction of the spring sufficiently to break or damage it. The spring is made of heavy metal having considerable strength so that when its ends 14 abut it will be capable of withstanding the further contractions of the wire without fracture.

In order to bridge the gap left at the neck of the loop in the trolley wire I provide a bridge member 15 having a width slightly greater than the trolley wire and provided on its upper face with upwardly inclined grooves 16 which receive the trolley wire as it leads from each guide wheel tangentially to the spring. The ends of the bridge are cut away so as to clear the wheels 8 and it is supported in position by a yoke 18 pivotally connected to the center of its upper portion by a cross bolt 19 and suspended by a coiled spring 20 from a hanger 21 which is made fast to the supporting arm 3 by the bolts 11. By this arrangement the bridge is held yieldingly against the wire and the latter is free to follow the changes in shape of the spring as it expands and contracts without wear or strain. The yoke 18 is preferably made with a wider spread than the width of the spring 10 so that the latter works freely between the yoke arms. To brace the ends of the bracket 4 against being spread by the pull of the wire against the guide wheels 8, I provide a brace bar 22 which at its ends is connected to the bracket by the same bolts 23 that are employed to connect the yokes to the bracket and form bearings for wheels 8.

In operation, having suspended the device above the trolley wire, a loop is formed in the latter and passed over the spring 10 and made fast thereto by the clamps 12 and 13. The bridge piece is then inserted and the upper end of the spring caught in the hanger 21, whereupon the device is ready for service. As the wire contracts the loop is contracted by the wire drawn away from the bracket and under the wheels 8, in doing which the free ends of the spring are drawn together until under maximum contraction conditions their ends 14 contract. As the wire expands the spring, which maintains constant tension on it, will expand with it as far as it is capable, taking in the slack over the wheels 8. For taking up slack in cables the bracket can be mounted in any suitable manner.

The device is simple in construction, very durable and can be interposed in the wire at any point without cutting the latter. As thus applied the device will prevent the stretching of the wire due to the action of seasonal expansion and contraction and will maintain a substantially uniform tension on the line which will prevent the sagging thereof between supports.

Having thus described my invention, what I claim as new and desire to secure by Letters Patent, is:—

1. In a device of the character described, a bracket, a spring attached to the bracket, and wire guides on the bracket to hold a loop of wire in position to encircle said spring, substantially as described.

2. In a device of the character described, a bracket, a curved band spring attached to the bracket, and wire guides on the bracket to hold a loop of wire in position to encircle said spring, substantially as described.

3. In a device of the character described, a bracket, a curved band spring attached to the bracket, wire guides on the bracket to hold a loop of wire in position to encircle said spring, and means to brace the guide bearing portions of the bracket together, substantially as described.

4. In a device of the character described, a bracket, a curved band spring attached to the bracket, wire guides on the bracket on each side of the spring to guide a loop of wire about said band, and a block to bridge the gap left at the neck of the loop, substantially as described.

5. In a slack take-up for trolley wire, a bracket having means for suspension above the trolley wire, spaced alining grooved guides on the bracket and disposed to engage the top edge of the trolley wire, a split spring ring connected overhead to the bracket and disposed to receive a loop formed in the trolley wire between said guides, means to bridge the gap left in the trolley wire at the neck of the loop, and means to brace together the guide ends of the bracket.

6. In a device of the character described, the combination with a U-shaped bracket, alining grooved rollers journaled at the ends of the bracket, a cross brace connecting the ends of said bracket, a curved band spring attached to the bracket and disposed in the same plane with said rollers, and a continuous trolley wire having a loop formed therein and disposed about said spring and under said rollers, substantially as described.

7. In a device of the character described, a spring, wire guides on each side of said spring and in a plane therewith, and supporting means for guides and spring which leave an opening for passing about the spring a loop formed at an intermediate point in a wire engaged by said guides.

8. In a device of the character described, a support having a horizontal arm, a bracket and a curved spring attached to said arm, grooved wheels pivoted to the bracket and disposed in line with said spring, and wire holding means at the top and sides of said spring.

9. In a device of the character described, a support, a bracket and a split ring spring attached thereto, wire guides on the bracket on each side of said spring, and means to hold a loop wire about the spring.

10. In a device of the character described, a split spring ring having its ends bent to present opposite stops which are adapted to abut when the spring is contracted, a support for the spring which leaves its ends free to expand and contract, and means to hold a loop in the wire to which the device is applied in position about said spring.

11. In a device of the character described, a spring, supporting means therefor, a loop formed in a strand of wire and passed around the spring, a bridge piece disposed across the neck of the loop, and yielding means to urge said bridge member toward the loop, substantially as described.

12. In a device of the character described, a bracket, a curved band spring attached to the bracket, wire guides on the bracket to hold a loop of wire in position to encircle said spring, and a brace to connect the guide bearing portions of the bracket together, substantially as described.

In testimony whereof I affix my signature.

DEMETRIUS H. HART.

Witness:
NOMIE WELSH.

Copies of this patent may be obtained for five cents each, by addressing the "Commissioner of Patents, Washington, D. C."